UNITED STATES PATENT OFFICE.

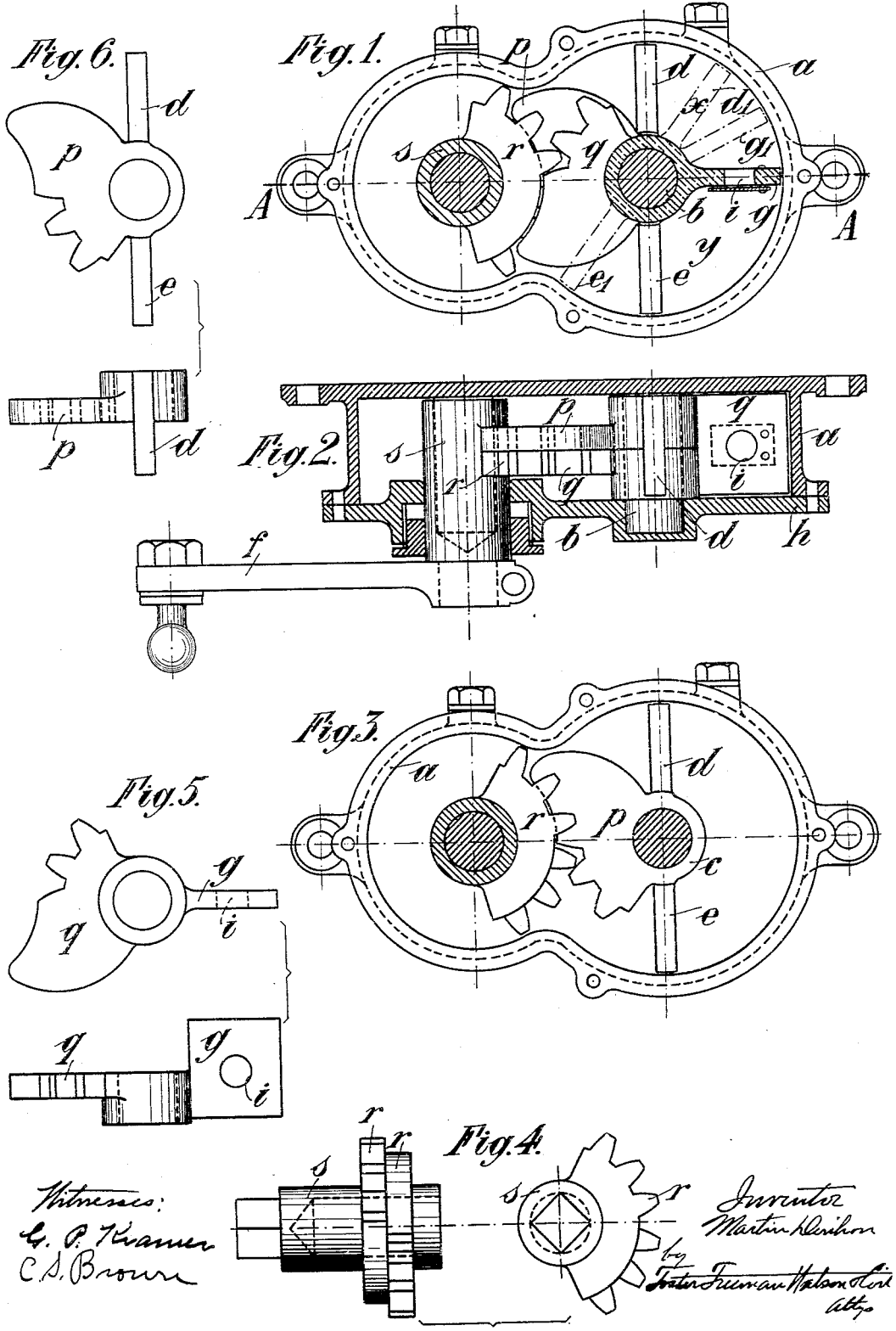

MARTIN DERIHON, OF LONCIN-LEZ-LIEGE, BELGIUM.

SHOCK-ABSORBER FOR VEHICLES.

1,068,330.　　　　　Specification of Letters Patent.　　Patented July 22, 1913.

Application filed August 8, 1912.　Serial No. 714,072.

*To all whom it may concern:*

Be it known that I, MARTIN DERIHON, subject of the King of Belgium, residing at Loncin-lez-Liege, Belgium, have invented certain new and useful Improvements in Shock-Absorbers for Vehicles, of which the following is a specification.

The present invention has for its object to provide an improved shock absorber for motor-cars and other suspended vehicles, so as to allow the suspension springs to be freely compressed or deflected, but retard the return movement which follows this compression or deflection of the spring. This retarding effect is, according to the present invention, of a constant value in both directions, whatever may be the amplitudes of vibration of the suspension springs. This result is obtained by means of a device which is arranged so as to have no effect on the resilient deflection of the spring, that is to say, on the relative displacements which take place between the spring and the vehicle frame in both directions away from the neutral position, but to restrain the rapidity of the return movements toward the relative neutral position of the frame and spring with a constant resistance, that is to say, whatever may be the position of the piston of the device.

The accompanying drawings represent a shock absorber constructed according to this principle.

Figure 1 represents a vertical longitudinal section through the shock absorber. Fig. 2 is a transverse horizontal section through A—A Fig. 1. Fig. 3 is a section similar to that shown in Fig. 1, but in which one of the parts of the absorber is supposed to be removed. Fig. 4 shows a front and side view of the actuating pinion. Figs. 5 and 6 represent the members of the absorber separately.

The shock absorber comprises a cylinder $a$ fixed to the vehicle frame and filled with oil. On an axle $b$ within the casing $a$ is rotatably mounted a hub $c$ provided with two, diametrically opposite, radially projecting blades $d$, $e$, and a toothed segment $p$. Secured to a second hub mounted to rotate about the axle $b$ is a partition plate $g$ which divides the space at one side of the blades $d$, $e$, into two chambers $x$, $y$. The chambers $x$, $y$, communicate with each other through a valve controlled passage $i$ in the plate $g$ and, in the embodiment of the invention illustrated, through the relatively small passage or clearance space between the free edges of said plate and the adjacent wall of the casing $a$. The two segments $p$ and $q$ engage with two adjacent segments $r$ (Figs. 1 and 4) carried by the rotatable hub $s$, upon which is fixed the crank $f$ (Fig. 2) connected to the vehicle spring or axle. The segments $p$ $q$ and $r$ are so related that the two hubs carrying the parts $d$, $e$ and $g$ are alternately actuated and in opposite directions. That is, a rocking of the crank $f$, and connected hub $s$, in one direction from the normal position will rock the blades $d$ $e$ while said blades will remain stationary when the crank and hub move in the opposite direction from such normal position. Similarly the blade $g$ will be moved toward the blade $d$ as the crank $f$ is shifted in one direction from its normal position and be held stationary when the crank moves in the opposite direction from the normal position during which movement the blades $d$ $e$ will be shifted relative to the plate $g$.

When the parts of the appliance are in their normal position, they are disposed as shown in full lines in Fig. 1. When the crank $f$ moves upward the division $g$ takes the position $g^1$ while divisions $d$ and $e$ are held stationary by the upper part of the engaging segment $p$. The return movement forces the oil through the space or passage between the outer edges of the plate $g$ and the wall of the casing from the compartment $y$ into the compartment $x$. When the crank $f$ moves downward the blades $d$ and $e$ are moved into the position $d^1$, $e^1$, the division $g$ remaining stationary. If desired the plate $g$ may be provided with an opening having adjustable closing means for the purpose of regulating the passage of oil from one side of said plate to the other when the parts are returning to normal position. It follows that the intensity with which the shock is cushioned is the same for large as for small oscillations, whatever may be the positions of the blades, and depends solely upon the opening or orifice through which the oil has to traverse.

Having fully described my invention, what I desire to claim and secure by Letters Patent is:—

1. A shock absorber for vehicles comprising, in combination, a cylinder containing oil, a rotary partition contained in the cylinder, a valve carried by the partition, two blades in the cylinder, a lever or crank arm, and toothed gearing connecting the partition and the blades to the crank, so that either the partition or the blades move freely according to whether the crank is rocked in one direction or the other from the neutral position.

2. A shock absorber comprising a casing adapted to contain a braking fluid, two blades rotatably mounted on a common axis in the casing, a plate mounted in the casing to rock about the same axis as and extending between the blades, a crank extending to the outside of the casing, and gearing connecting the crank with and adapted to oscillate said blades and plate alternately as it moves in opposite directions from its normal position and to hold either the blades or plate stationary while moving the other of said elements.

3. A shock absorber comprising a casing adapted to contain a braking fluid, a hub mounted to rotate within the casing and provided with two radially projecting blades, a second hub rotatably mounted in the casing and having a radially projecting plate that extends between said blades and is provided with a valve, a crank extending to the outside of the casing, and gearing connecting the crank with both hubs, whereby movement of the crank in opposite directions from its normal position will alternately oscillate said hubs.

In testimony whereof I have hereunto set my hand in presence of two subscribing witnesses.

MARTIN DERIHON.

Witnesses:
A. P. CRUGER,
J. BOUTAY.

Copies of this patent may be obtained for five cents each, by addressing the "Commissioner of Patents, Washington, D. C."